United States Patent [19]

Kajitani et al.

[11] Patent Number: 4,610,853
[45] Date of Patent: Sep. 9, 1986

[54] PROCESS FOR PRODUCING PURIFIED MONOAMMONIUM PHOSPHATE FROM WET PROCESS PHOSPHORIC ACID

[75] Inventors: Taizo Kajitani; Shigeo Fujii; Tadao Sato; Ikuo Yonehara; Chikashi Fukumura; Kenji Harita, all of Kitakyushushi, Japan

[73] Assignee: Chisso Corporation, Osaka, Japan

[21] Appl. No.: 709,923

[22] Filed: Mar. 8, 1985

[51] Int. Cl.⁴ .................................. C01B 25/28
[52] U.S. Cl. .................................. 423/310; 423/313
[58] Field of Search ........................... 423/310, 313

[56] References Cited

U.S. PATENT DOCUMENTS

| | | | |
|---|---|---|---|
| 995,898 | 6/1911 | Peacock | 423/310 |
| 1,208,877 | 12/1916 | Wollenweber | 423/310 |
| 1,264,513 | 4/1918 | Hechenbleikner | 423/310 |
| 1,716,415 | 6/1929 | Buchanan | 423/310 |
| 4,017,588 | 4/1977 | Davidson | 423/310 |
| 4,325,927 | 4/1982 | Weston et al. | 423/310 |

Primary Examiner—John Doll
Assistant Examiner—Wayne A. Langel
Attorney, Agent, or Firm—Fred Philpitt

[57] ABSTRACT

A process for producing purified monoammonium phosphate (abbreviated to MAP) directly from wet process phosphoric acid with a high yield is provided, which process comprises reacting wet process phosphoric acid with $NH_3$ at 50°~80° C. while keeping the molar ratio of $NH_3/H_3PO_4$ at 0.9~1.35; separating the resulting slurry containing MAP crystals and an insoluble sludge into a slurry containing the former and a slurry containing the latter; treating the former slurry in a conventional manner to recover MAP; while treating the latter slurry by heating it to 60°~95° C. to dissolve MAP contained therein, removing the sludge by centrifugal separation and concentrating the filtrate to recover MAP; and combining the two portions of MAP.

2 Claims, 1 Drawing Figure

PROCESS FOR PRODUCING PURIFIED MONOAMMONIUM PHOSPHATE FROM WET PROCESS PHOSPHORIC ACID

BACKGROUND OF THE INVENTION

1. Field of the Invention

This invention relates to a process for producing purified monoammonium phosphate from wet process phosphoric acid. More particularly it relates to a process for producing industrially usable ammonium phosphate directly from wet process phosphoric acid with a high yield.

2. Description of the Prior Art

Monoammonium phosphate obtained by reacting ammonia with wet process phosphoric acid contains a large amount of impurities originated from the above phosphoric acid; hence it can be used as fertilizers, but cannot be used for industrial uses, as it is. For producing industrial purified monoammonium phosphate from wet process phosphoric acid, it is necessary to purify the phosphoric acid in advance according to a process of extracting phosphoric acid from wet process phosphoric acid according to solvent process, followed by reacting ammonia with the resulting extract to obtain monoammonium phosphate containing a small amount of impurties.

However, this extraction process cannot be regarded as an industrially advantageous process due to its complicated steps. On the other hand, as to various compounds stepwise formed by the reaction of wet process phosphoric acid with ammonia, "Studies on Chemical fertilizers" (written by Ando and Akiyama, issued as a reprint on May 20, 1976, from Nissin Syuppan K.K.) has suggested for the present a possibility of producing industrial ammonium phosphate from a mother liquor of ammonium phosphate obtained by neutralizing wet process phosphoric acid with ammonia under certain neutralization conditions to form (FeAl)NH$_4$H$_2$(PO$_4$)$_2$.$\frac{1}{2}$H$_2$O (abbreviated to Q compound) or (FeAl)NH$_4$HF$_2$PO$_4$ (abbreviated to S compound) to thereby obtain the mother liquor of ammonium phosphate having Fe, Al and F contained in wet process phosphoric acid removed therefrom. However, this process also has a drawback that it requires such prolonged steps as stepwise pH control, filtration step and crystallization step, which results in increase of energy consumption.

On the other hand, according to French Pat. No. 1,248,055 (Prayon process), an industrial purified product is obtained by reacting ammonia with wet process phosphoric acid, partly forming crystals of diammonium phosphate in the reaction liquid, separating the crystals, cutting a part of the resulting mother liquor to reduce the amount of impurities originated from wet process phosphoric acid, thereafter concentrating the mother liquor to crystallize raw crystals, and recrystallizing the raw crystals. The yield of purified diammonium phosphate obtained according to the process is about 40~50% based on P$_2$O$_5$ content in wet process phosphoric acid as raw material, and the remainder of P$_2$O$_5$ ultimately is used as ammonium phosphate for fertilizers.

The yield of ammonium phosphate based on phosphoric acid in the above description is defined as "percentage recovery" as follows:

$$\text{Percentage recovery} = \frac{\text{Amount of P}_2\text{O}_5 \text{ contained in ammonium phosphate crystals}}{\text{Amount of P}_2\text{O}_5 \text{ in wet process phosphoric acid as raw material}} \times 100\%$$

As described above, when wet process phosphoric acid is directly neutralized, the yield of purified ammonium phosphate based on phosphoric acid is considerably low.

In view of the above problems of the prior art, the present inventors have made extensive research in order to find a process for producing monoammonium phosphate with a high yield i.e. a high percentage recovery by direct neutralization of wet process phosphoric acid.

As a result, we have found that when wet process phosphoric acid and ammonia are reacted at 50°~80° C. while the molar ratio of NH$_3$/H$_3$PO$_4$ is kept at 0.9 to 1.35, followed by separating the resulting slurry containing monoammonium phosphate crystals and an insoluble sludge into a slurry containing the former and a slurry containing the latter, treating the former slurry according to a conventional process to recover monoammonium phosphate, while treating the latter slurry according to a process described later to remove the sludge and concentrating the resulting filtrate to recover monoammonium phosphate, and combining the two portions of monoammonium phosphate whereby monoammonium phosphate can be recovered with a high yield. The above-mentioned process for treating the slurry containing an insoluble sludge refers to a process of heating the slurry to 60°~95° C. to dissolve monoammonium phosphate contained therein, followed by centrifugal separation and recovery of the resulting filtrate.

As is apparent from the above description, an object of the present invention is to provide a process for obtaining monoammonium phosphate from wet process phosphoric acid with a high yield. Another object of the present invention is to provide monoammonium phosphate produced according to the above process.

SUMMARY OF THE INVENTION

The present invention has a main constitution (1) and an embodiment (2) as follows:

(1) A process for producing purified monoammonium phosphate from wet process phosphoric acid which process comprises ① reacting ammonia with wet process phosphoric acid in a reactor while keeping the reaction temperature at 50° to 80° C. and the molar ratio of NH$_3$/H$_3$PO$_4$ at 0.9 to 1.35%;

② separating the resulting slurry containing monoammonium phosphate crystals and an insoluble sludge into a slurry containing the portion of said crystals and a slurry containing the portion of said insoluble sludge;

③ subjecting said slurry containing the portion of said crystals to centrifugal separation to thereby recover the crystals, while returning the separated liquid to said reactor;

④ heating said slurry containing the portion of said insoluble sludge to 60° to 95° C. to dissolve monoammonium phosphate contained therein, followed by subjecting the resulting liquid to centrifugal separation and deposition into an insoluble sludge and a filtrate, while returning the separated filtrate to said reactor;

(5) concentrating the liquids returned to said reactor at the steps (3) and (4) to form a slurry containing monoammonium phosphate crystals; and (6) repeating the steps (2)~(4).

(2) A process according to the above item (1) wherein said separated slurry containing the portion of an insoluble sludge is mixed with 30 parts by weight or less of water based on 100 parts by weight of said slurry in advance of subjecting said slurry to centrifugal separation and deposition.

DETAILED DESCRIPTION OF THE PREFERRED EMBODIMENTS

Figure 1:
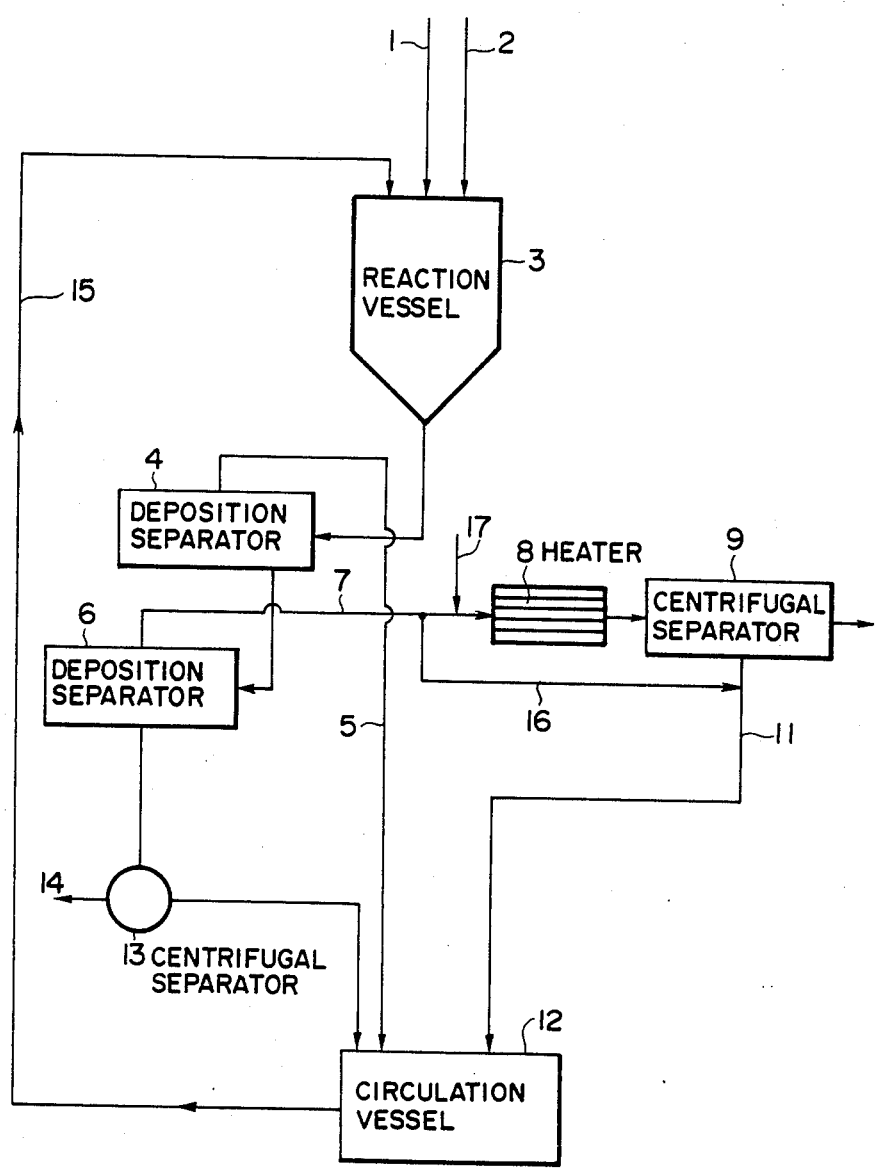
FIG. 1 shows a flow sheet of an apparatus employed in the process of the present invention.

The constitution and effectiveness of the present invention will be described below in more detail.

The wet process phosphoric acid used in the present invention refers to the so-called wet process phosphoric acid obtained by treating rock phosphate with a mineral acid, and as for the process for producing the phosphoric acid, any of the so-called hemihydrate process, dihydrate process and hemihydrate-dihydrate process may be employed.

As for ammonia used in the present invention, it is simplest to use gaseous ammonia and blow it in the above wet process phosphoric acid. However, an aqueous ammonia having a concentration of 20 to 30% by weight may also be used.

The essential specific feature of the process of the present invention consists in an organic combination of the following three points:

Firstly, a wet process phosphoric acid and ammonia are continuously fed into a slurry of monoammonium phosphate crystals adjusted to a molar ratio of $NH_3/H_3PO_4$ of 0.9 to 1.35, and while the molar ratio is maintained, there is formed a slurry containing both monoammonium phosphate crystals and an insoluble sludge originated from the wet process phosphoric acid.

Secondly, the above slurry is separated into a part containing monoammonium phosphate and a part containing the insoluble sludge, according to a separation process (e.g. by means of a thickener), and the former part is treated in a conventional manner to obtain monoammonium phosphate.

Thirdly, the slurry containing the insoluble sludge, separated as above is heated to dissolve monoammonium phosphate, followed by separating the resulting slurry into the sludge and a filtrate through centrifugal separation and deposition and circulating and concentrating the filtrate to form monoammonium phosphate crystals.

By employing the above procedure, separation and removal of the sludge as impurities are efficiently carried out and as result, the yield of monoammonium phosphate is substantially raised.

The process of the present invention will be described below, referring to the accompanying drawing.

In FIG. 1, numeral 1 refers to a phosphoric acid feeding pipe and 2, an ammonia feeding pipe. A phosphoric acid and ammonia are fed into a reaction vessel 3 wherein neutralization reaction is carried out. The proportion of the two raw materials fed is 0.9 to 1.35, preferably 1.0 to 1.3 in terms of the molar ratio of $NH_3/H_3PO_4$. The reaction temperature is preferably in the range of 60° to 80° C. If they are reacted at temperatures lower than 60° C., heat removal cost is required, while if reacted at temperatures exceeding 80° C., temperature maintenance cost is required; hence both the reactions at temperatures outside the range are not economical. Further, outside the above temperature range, deposition and clogging of monoammonium phosphate are liable to occur at heat-dissipated parts such as reaction slurry-withdrawing pipe. Through the above neutralization reaction, an ammonium phosphate slurry as a reaction mixture is formed in the reaction vessel 3. This slurry consists of monoammonium phosphate crystals, ammonium phosphate mother liquor and an insoluble sludge as an aggregate of insoluble impurities. This ammonium phosphate slurry is continuously or intermittently sent to deposition separators 4 and 6 where the slurry is separated into a slurry containing monoammonium phosphate in a larger ammount and a slurry containing the insoluble sludge in a larger amount. The former slurry is sent from the separator 6 into a centrifugal separator 13 where it is separated into monoammonium phosphate (note: purified product) and the filtrate, the monoammonium phosphate being washed with a small amount of water to recover it as product 14, and the filtrate being sent to a circulation vessel 12. In addition, a slurry circulating piping 5 constitutes a bypass for controlling the functions of the deposition separators 4 and 6. The slurry containing the insoluble sludge in a larger amount, separated by the separator 6, is sent via a piping 7 to a heater 8 where the slurry is heated to 60° to 95° C. (temperatures higher by 10° to 15° C. than those at which the slurry enters the heater 8) to dissolve all of monoammonium phosphate crystals contained in the slurry. The thus heated slurry is then treated by means of a centrifugal separator 9 which can separate more finely-divided particles than the above separator 13 such as a continuous solid bowl centrifuge of 2,000 G or more (Super-Decanter, a tradename of product manufactured by TOMOE Company, Ltd.) to thereby separate the slurry into the insoluble sludge 10 and a filtrate. This separation can be smoothly and efficiently carried out by mixing with 90 parts by weight of the slurry, 10% by weight or less of water added via a feeding piping 17, in the heater 8.

Since the thus obtained sludge still contains a considarable amount of phosphoric acid matters as by-product, it can be used as fertilizer or in other applications. The filtrate sent from the centrifugal separator 9 enters via a piping 11 the circulation vessel 12 where the filtrate is combined with that sent from the centrifugal separator 13 and returned to the neutralization reaction vessel 3 via a filtrate piping 15. Piping 16 refers to a piping for circulating the slurry containing the insoluble sludge, and constitutes a bypass as in the case of the above slurry-circulating pipe 5. Such a filtrate circulation can be continuously carried out after (neutralization of wet process phosphoric acid with ammonia)→ slurry formation→slurry withdrawal (continuous or intermittent) have reached a stationary state; thus since no separate concentration-crystallization is required, the circulation is rational. Of course, it is also possible to independently subject the filtrate of the circulation vessel 12 to concentration, cooling and crystallization treatments to thereby recover monoammonium phosphate separately. The above concentrating of the circulating filtrate may be carried out by utilizing the neutralization heat of phosphoric acid and ammonia in the reaction vessel 3 and employing an open vessel as the reaction vessel as far as this is possible. Of course, however, the circulation vessel 12 may be at the same time employed as the concentration vessel, or the concentration vessel may be provided midway on the piping 15.

According to the process of the present invention, after the neutralization of phosphoric acid with ammonia, only by separating the slurry containing monoammoium phosphate crystals, also separating monoammonium phosphate from the slurry containing the insoluble sludge part and circulating the resulting filtrates to the neutralization step, it is possible to obtain monoammonium phosphate (a product having an extremely low content of water-insolubles and other impurities, see Example 1) with a yield as high as about 70%. Further, it is also possible to recover the sludge part which cannot be obtained as monoammonium phosphate and utilize it as fertilizer or in other applications; thus no waste occurs and also there is no fear of environmental pollution.

The present invention will be described in more detail by way of Control examples and Examples.

CONTROL EXAMPLE 1

Employing the apparatus of the drawing and in a molar ratio of $NH_3/H_3PO_4$ of 0.9 to 1.35, monoammonium phosphate was produced through neutralization of a wet process phosphoric acid (analytical values: $P_2O_5$ 31.3%, $SO_3$ 0.81%, F 0.51%, Ca 0.19%, Al 0.25%, Fe 0.57% and Mg 0.21%) with ammonia. The slurry obtained in the reaction vessel 3 was sent via deposition separators 4 and 6 to centrifugal separator 13. The resulting filtrate was circulated via piping 15 to reaction vessel 3, and operations of piping 7, heater 8 and centrifugal separator 9 were not carried out until the percentage recovery reached 45%.

When the percentage recovery exceeded 45%, transfer of the slurry to centrifugal separator 13 was stopped, and the slurry passed through deposition separators 4 and 6 was sent via piping 7 to heater 8 where it was heated from about 60° C. as a temperature before heating, up to 70° C., to dissolve monoammonium phosphate contained in the slurry, followed by treatment in centrifugal separator 9 where the slurry was separated into an insoluble sludge and a filtrate.

In addition, the SS concentration in the slurry at the inlet of centrifugal separator 9 was 20.7% and that in the filtrate after separated there was 2.55% ("SS concentration" refers to the percentage by weight of filtration residue i.e. insolubles obtained by dissolving the samples (1 g) in water (100 ml) and filtering the solution). Further, the insoluble sludge discharged from centrifugal separator 9 had the following composition (% by weight):

A–N (ammonia-form nitrogen): 7.65%,
T-$P_2O_5$ (total phosphoric acid matters): 35.7%.

The respective filtrates separated at centrifugal separator 9 as above (each 100 Kg) were subjected to successive vaporization-concentration at 60°~70° C., followed by stepwise crystallization as shown in Table 1 described later (shown in terms of percentage recovery).

The crystallized material was subjected to centrifugal separation to remove the liquid, followed by water-washing (amount of water used: 100 cc per Kg of the crystallized material), and the washing water was returned to the filtrate obtained by the above liquid removal. In the above process, an insoluble sludge accumulated in the filtrate during the vaporization-concentration, but the above crystallization was continued without separating the sludge. The analytical values of the quality of the thus obtained monoammonium phosphate crystals relative to each of the percentages recovery are shown in Table 1.

TABLE 1

| Percentage recovery (%) | Quality of crystal (% by weight) | |
| --- | --- | --- |
|  | SS | $SO_3$ |
| 49.3 | 0.14 | 0.02 |
| 50.9 | 0.34 | 0.04 |
| 57.5 | 0.20 | 0.09 |
| 61.0 | 0.62 | 0.08 |
| 67.4 | 0.82 | 0.11 |
| 70.5 | 0.98 | 0.15 |

CONTROL EXAMPLE 2

Control example 1 was repeated till the percentage recovery of monoammonium phosphate reached 45%. When the percentage recovery exceeded 45%, 20 parts by weight of water were added to 80 parts by weight of the slurry fed via deposition separators 4 and 6 and piping 7 to heater 8, followed by heating the mixture up to 70° C. to dissolve monoammonium phosphate contained in the slurry. The filtrate obtained from centrifugal separator 9 was almost transparent.

The analytical values of the quality of the thus obtained monoammonium phosphate crystals, for each of the percentages recovery are shown in Table 2.

TABLE 2

| Percentage recovery (%) | Quality of crystal (% by weight) | |
| --- | --- | --- |
|  | SS | $SO_3$ |
| 50.2 | 0.04 | 0.27 |
| 55.1 | 0.02 | 0.14 |
| 59.9 | 0.04 | 0.14 |
| 64.9 | 0.04 | 0.07 |
| 69.4 | 0.04 | 0.16 |
| 73.7 | 0.04 | 0.03 |
| 78.8 | 0.08 | 0.20 |
| 80.8 | 0.22 | 0.68 |
| 83.4 | 0.30 | 0.20 |

EXAMPLE 1 AND COMPARATIVE EXAMPLE 1

Monoammonium phosphate was produced employing the apparatus shown in FIG. 1.

The same wet process phosphoric acid as used in Control example 1 (2,000 l/Hr.) was continuously fed to reaction vessel 3, and at the same time, ammonia gas was continuously blown in the vessel, while at the exit of the vessel, the molar ratio of $NH_3/H_3PO_4$ was kept at 1.0 to 1.3, and the temperature, at 60° C. The resulting slurry containing monoammonium phosphate crystals and an insoluble sludge was continuously withdrawn into deposition separators 4 and 6.

The slurry was separated in the separator 6 into a slurry containing monoammonium phosphate crystals and a slurry containing the insoluble sludge. The former slurry was separated in centrifugal separator 13 into monoammonium phosphate and a filtrate, and this monoammonium phosphate was washed with a small amount of water and then recovered. The latter slurry was sent via piping 7 to heater 8 where it was kept at 70°~75° C. and then continuously fed at a rate of 1,400 Kg/Hr. to centrifugal separator 9 (a superdecanter; centrifugal effect, 2,000 G) where it was separated into the insoluble sludge and a filtrate, this filtrate being circulated together with the filtrate from centrifugal separator 13, via circulation vessel 12 to reaction vessel 3.

On the other hand, for comparison, Example 1 was repeated except that without separating the slurry from reaction vessel 3 in deposition separators 4 and 6 (hence heater 8 and centrifugal separator 9 being not operated), the slurry was subjected, as it was, to centrifugal separator 13 to recover monoammonium phosphate (Comparative example 1).

The percentage recovery and the analytical values of the quality (SS and $SO_3$ % by weight) of monoammonium phosphate crystals obtained in Example 1 and Comparative example 1 are shown in Table 3.

TABLE 3

|  | Percentage recovery (%) | Quality SS | Quality $SO_3$ | Note |
| --- | --- | --- | --- | --- |
| Compar. ex. 1 | 45 | 0.3~1.0 | 0.2~0.3 | 8, 9 were* not operated |
| Example 1 | 85 | 0.4~0.8 | 0.2~0.3 | 8, 9 were operated |

*8: heater, 9: centrifugal separator

EXAMPLE 2

In the same manner as in Example 1, the slurry formed in reaction vessel 3 was separated in separator 6 into a slurry containing monoammonium phosphate crystals and a slurry containing an insoluble sludge, and the former slurry was treated as in Example 1 to recover monoammonium phosphate. But the latter slurry was sent via piping 7 to heater 8 where it was kept at 70°~75° C., and before it was continuously fed to centrifugal separator 9 at a rate of 1,400 Kg/Hr., water (about 280 Kg/Hr.) was fed via piping 17 thereto. The appearance of the filtrate separated in centrifugal separator 9 was almost clear. This filtrate and the insoluble sludge separated in the centrifugal separator were treated in the same manner as in Example 1.

The percentage recovery and the analytical values of the quality of the thus obtained monoammonium phosphate crystals were as follows:

| Percentage recovery | Quality SS | Quality $SO_3$ |
| --- | --- | --- |
| 70% | 0.4~0.3% | 0.2~0.3% |

What we claim is:

1. A process for producing purified monoammonium phosphate from wet process phosphoric acid which process comprises
    (a) reacting ammonia with wet process phosphoric acid in a reactor while keeping the reaction temperature at 50° to 80° C. and the molar ratio of $NH_3/H_3PO_4$ at 0.9 to 1.35 to form a slurry comprising monoammonium phosphate crystals and an insoluble sludge;
    (b) separating the resulting slurry containing monoammonium phosphate crystals and an insoluble sludge into a slurry containing a larger portion of said crystals and a slurry containing a larger portion of said insoluble sludge;
    (c) subjecting said slurry containing the larger portion of said crystals to centrifugal separation and deposition to thereby recover the crystals, while returning the separated liquid to said reactor;
    (d) heating said slurry containing the larger portion of said insoluble sludge to 60° to 95° C. to dissolve monoammonium phosphate contained therein, followed by subjecting the resulting liquid slurry to centrifugal separation to thereby form an insoluble sludge and a filtrate, and returning the separated filtrate to said reactor;
    (e) concentrating the liquids returned to said reactor at the steps (c) and (d) to form a slurry containing monoammonium phosphate crystals; and
    (f) repeating the steps (b)-(d).

2. A process according to claim 1 wherein said separated slurry containing the larger portion of an insoluble sludge is mixed with 30 parts by weight or less of water based on 100 parts by weight of said slurry in advance of subjecting said slurry to centrifugal separation and deposition.

* * * * *